United States Patent [19]

Feldmeier

[11] Patent Number: 5,583,859
[45] Date of Patent: Dec. 10, 1996

[54] DATA LABELING TECHNIQUE FOR HIGH PERFORMANCE PROTOCOL PROCESSING

[75] Inventor: David C. Feldmeier, Morristown, N.J.

[73] Assignee: Bell Communications Research, Inc., Morristown, N.J.

[21] Appl. No.: 298,557

[22] Filed: Aug. 30, 1994

[51] Int. Cl.⁶ .................................................. H04L 12/56
[52] U.S. Cl. ........................................... 370/471; 370/473
[58] Field of Search ............................... 370/60, 60.1, 79, 370/82, 83, 85.13, 94.1, 99; 395/200, 375, 325; 371/37.1, 37.7, 37.6

[56] References Cited

U.S. PATENT DOCUMENTS

| | | | |
|---|---|---|---|
| 5,050,166 | 9/1991 | Catoni et al. | 370/61 |
| 5,124,984 | 6/1992 | Engel | 370/94.1 |
| 5,136,584 | 8/1992 | Hedlund | 370/94.1 |
| 5,163,045 | 11/1992 | Caram et al. | 370/60 |
| 5,278,834 | 1/1994 | Mazzola | 370/94.1 |
| 5,280,476 | 1/1994 | Kojima et al. | 370/60.1 |
| 5,371,852 | 12/1994 | Attanasio et al. | 370/85.13 |

OTHER PUBLICATIONS

A. G. Fraser and W. T. Marshall, "Data Transport in a Byte Stream Network", *IEEE Journal on Selected Areas in Communications*, 7,(7):1020–1033 Sep. 1989.

J. Postel, "Inernet Protocol", RFC 791, DARPA Network Working Group, Sep. 1981.

D. R. Cheriton, "VMTP: A Transport Protocol for the Nect Generation of Communication Systems", *Proc. ACM SIGCOMM '86*, pp. 406–415, Stowe, VT, Aug. 1986.

J. P. G. Sterbenz and G. M. Parulkar, "Axon: A High Speed Communication Architecture for Distrributed Applications", Proc. IEEE INFO–COM '90, pp. 415–425, San Francisco, CA. Jun., 1990.

R. W. Watson, "Delta–t Protocol Specification", UCID–19293, Lawrence Livermore Laboratory, Apr. 1983.

G. Chesson et al., "XTP Protocol Definition, Revision 3.5", PEI–90–120, Protocol Engines Inc., Santa Barbara, CA., Sep. 1990.

B. S. Davie, "A Host–Network Interface Architecture for ATM", *Proc. ACM SIGCOMM '91* pp. 307–315, Zurich, Switzerland, Sep. 1991.

D. A. Borman, "Implementing TCP/IP on a Cray Computer", *ACM Computer Communication Review*, 19(2), Apr. 1989.

V. Jacobson, "Compressing TCP/IP Headers for Low–Speed Serial Links", RFC 1144, DARPA Network Working Group, Feb. 1990.

C. A. Sunshine, "Interconnection of Computer Networks", *Computer Networks*, 1(3):175–195, Jan., 1977.

C. A. Kent and J. C. Mogul, "Fragmentation Considered Harmful", *Proc. ACM SIGCOMM '87*, pp. 390–401, Stowe, VT, Aug. 1987.

V. G. Cerf and R. E. Kahn, "A Protocol for Packet Network Intercommunication", *IEEE trans. on Comm.*, COM–22(5):637–648, May 1974.

J. S.Turner, "Managing Bandwidth in ATM Networks with Bursty Traffic", *IEEE Network*, 6(5):50–58, Sep. 1992.

(List continued on next page.)

*Primary Examiner*—Alpus H. Hsu
*Assistant Examiner*—Chau T. Nguyen
*Attorney, Agent, or Firm*—Joseph Giordano; James W. Falk

[57] ABSTRACT

In accordance with the present invention, data is transmitted through a network in chunks. Chunks are self-describing units designed for high speed protocol processing. Packets act as envelopes for carrying chunks across a network. The self-describing nature of chunks allow them to be processed as they arrive at the receiver regardless of any misordering. The ability to process data without intermediate buffering for reordering or reassembly improves protocol processing performance. The chunks also distribute protocol data units control overhead over multiple packets.

17 Claims, 9 Drawing Sheets

OTHER PUBLICATIONS

J. P. G. Sterbenz, et al., "Hardware Based Error and Flow Control in the Axon Gigabit Host–Network Interface", *Proc. IEEE INFO–COM '92*, pp. 282–293, Florence, Italy, May 1992.

J. H. Salzter, D. P. Reed and D. D. Clark, "End–to–End Arguments in system Design", *ACM Transactions on Computer Systems*, 2(4);277–288, Nov. 1984.

T. Lyon, "Simple and Efficient Adaptation Layer (SEAL)", T1, S1 5/91–292, ANSI, Aug., 1991.

M. de Prycker, *Asynchronous Transfer Mode Solution for Broadband ISDN*, Ellis Horwood, Chichester, England 1991.

E. W. Biersack, et al., "Gigabit Networking Research at Bellcore", *IEEE Network*, 6(3):42–48, Mar. 1992.

D. D. Clark, et al., "An Overview of the AURORA Gigabit Testbed", *Proc. INFOCOM '92*, Florence, Italy, May, 1992.

D. D. Clark and D. L. Tennenhouse, "Architectural Considerations for a New Generation of Protocols", *Proc. ACM SIGCOMM '90*, pp. 200–208, Philadelphia, PA, Sep., 1990.

S. W. O'Malley and L. I. Peterson, "A Highly Layered Architecture for High–Speed Networks", M. Johnson, Ed., *Protocols for High–Speed Networks, II,* pp. 141–156, Palo Alto, CA., Nov. 1990, North–Holland Publ., Amsterdam, The Netherlands.

B. Pehrson, P. Gunningberg and S. Pink, "Distributed Multimedia Applications on Gigabit Networks", *IEEE Network Magazine*, 6(1):26–35, Jan. 1992.

D. C. Feldmeier and A. J. McAuley, "Reducing Protocol Ordering Constraints to Improve Performance", B. Pehrson, P. Gunninberg and S. Pink, Eds., *Protocols for High–Speed Networks, III,* pp. 3–17, Stockholm, Sweden, May 1992, North–Holland Publ., Amsterdam, The Netherlands.

D. C. Feldmeier, "Multiplexing Issues in Communication System Design", *Proc. ACM SIGCOMM '90*, pp. 209–219, Philadelphia, PA, Sep. 1990.

J. F. Schoch, "Packet Fragmentation in Inter–Network Protocols", Computer Networks, 3(1):3–8, Feb. 1979.

| FIELD | CHANGED BY FRAGMENTATION? | HOW DETECTED? |
|---|---|---|
| C.ID | NO | ERROR DETECTION CODE |
| C.SN | YES | CONSISTENCY CHECK |
| C.ST | YES | ERROR DETECTION CODE |
| T.ID | NO | ERROR DETECTION CODE |
| T.SN | YES | REASSEMBLY ERROR |
| T.ST | YES | REASSEMBLY ERROR |
| X.ID | NO | ERROR DETECTION CODE |
| X.SN | YES | CONSISTENCY CHECK |
| X.ST | YES | ERROR DETECTION CODE |
| TYPE | NO | REASSEMBLY ERROR |
| LEN | YES | REASSEMBLY ERROR |
| SIZE | NO | REASSEMBLY ERROR |
| DATA | NO | ERROR DETECTION CODE |
| CONTROL | NO | ERROR DETECTION CODE |
| ED CODE | NO | – |

DATA LABELING TECHNIQUE FOR HIGH PERFORMANCE PROTOCOL PROCESSING

FIELD OF THE INVENTION

The present invention relates to a method for transmitting data through a network such as a packet network. Specifically, the present invention relates to a data transmission technique in which a group of data that require identical processing have a completely self-describing header. The self-describing group of data I call a chunk. By self-describing it is meant that the chunk header contains enough information so that the chunk can be processed by an entire protocol stack at a receiving station without depending on the arrival of any other chunk. Thus, the use of chunks overcomes a shortcoming of prior art transmission techniques which require the reordering of received data before processing.

BACKGROUND OF THE INVENTION

Figure 1:
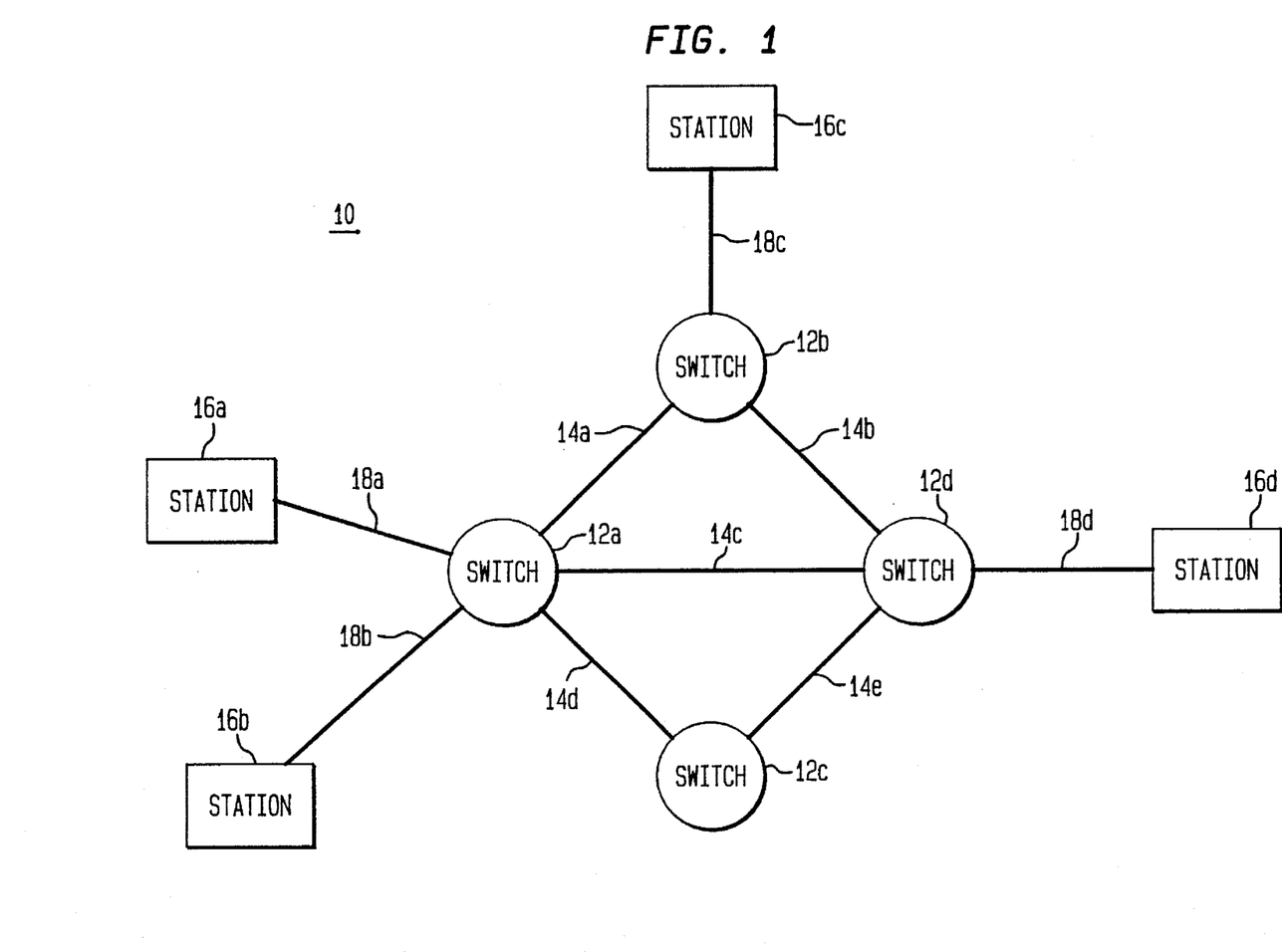
FIG. 1, FIG. 2 and FIG. 3 illustrate a conventional packet network.

FIG. 1 schematically illustrates a conventional packet switching network. The network 10 comprises a plurality of packet switches 12-A, 12-B, 12-C, 12-D. The packet switches 12-A, 12-B, 12-C, 12-D are interconnected by the transmission paths 14-A, 14-B, 14-C, 14-D, 14-E. Illustratively, the packet switches 12 are ATM (Asynchronous Transfer Mode) switches.

A plurality of user stations 16-A, 16-B, 16-C, 16-E are connected to the switches 12 by the transmission paths 18-A, 18-B, 18-C, 18-D.

Figure 2:
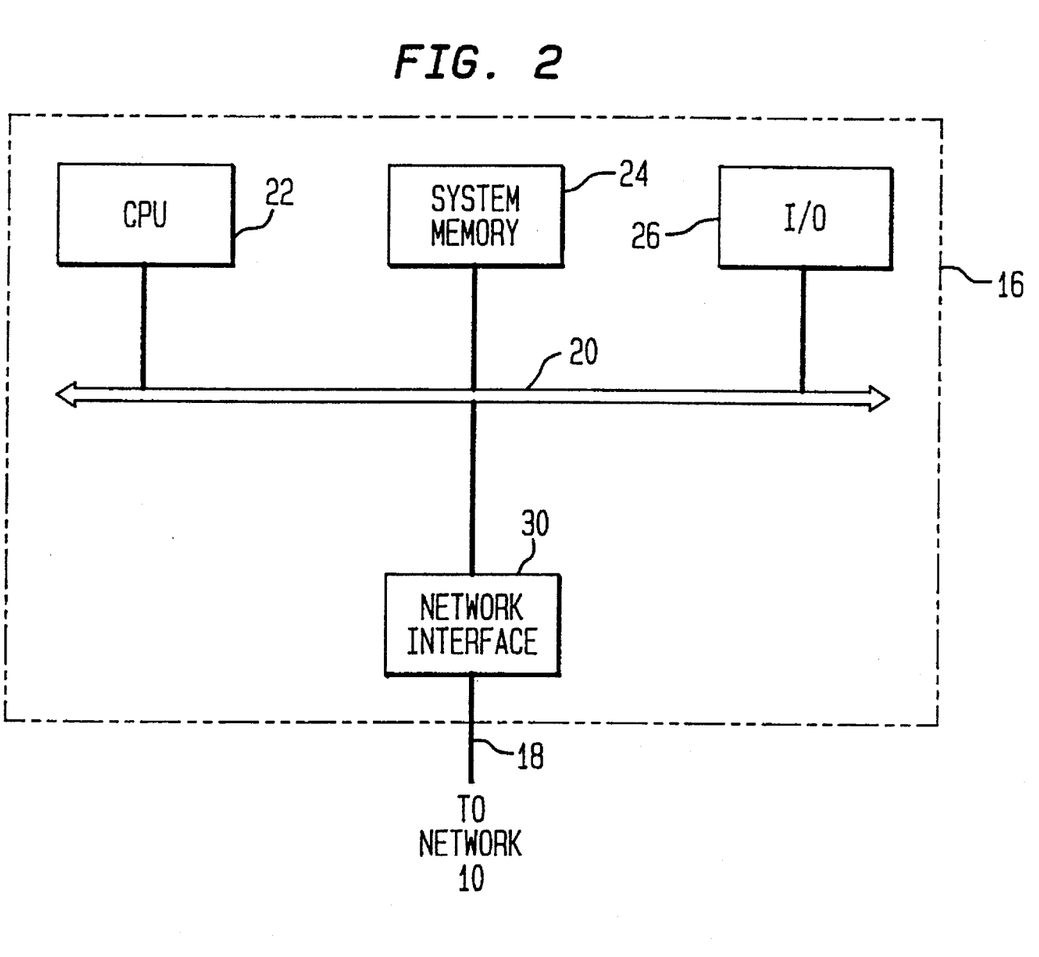

An illustrative user station 16 is shown in greater detail in FIG. 2. The user station 16 includes a bus 20. Connected to the bus 20 is a CPU 22, a system memory 24, and an I/O device 26. Depending on the applications run by the station 22, the station 22 may include additional CPU's, one or more cache memory modules, and additional I/O devices. The user station 16 also includes a network interface 30 for interfacing with the network 10.

Figure 3:
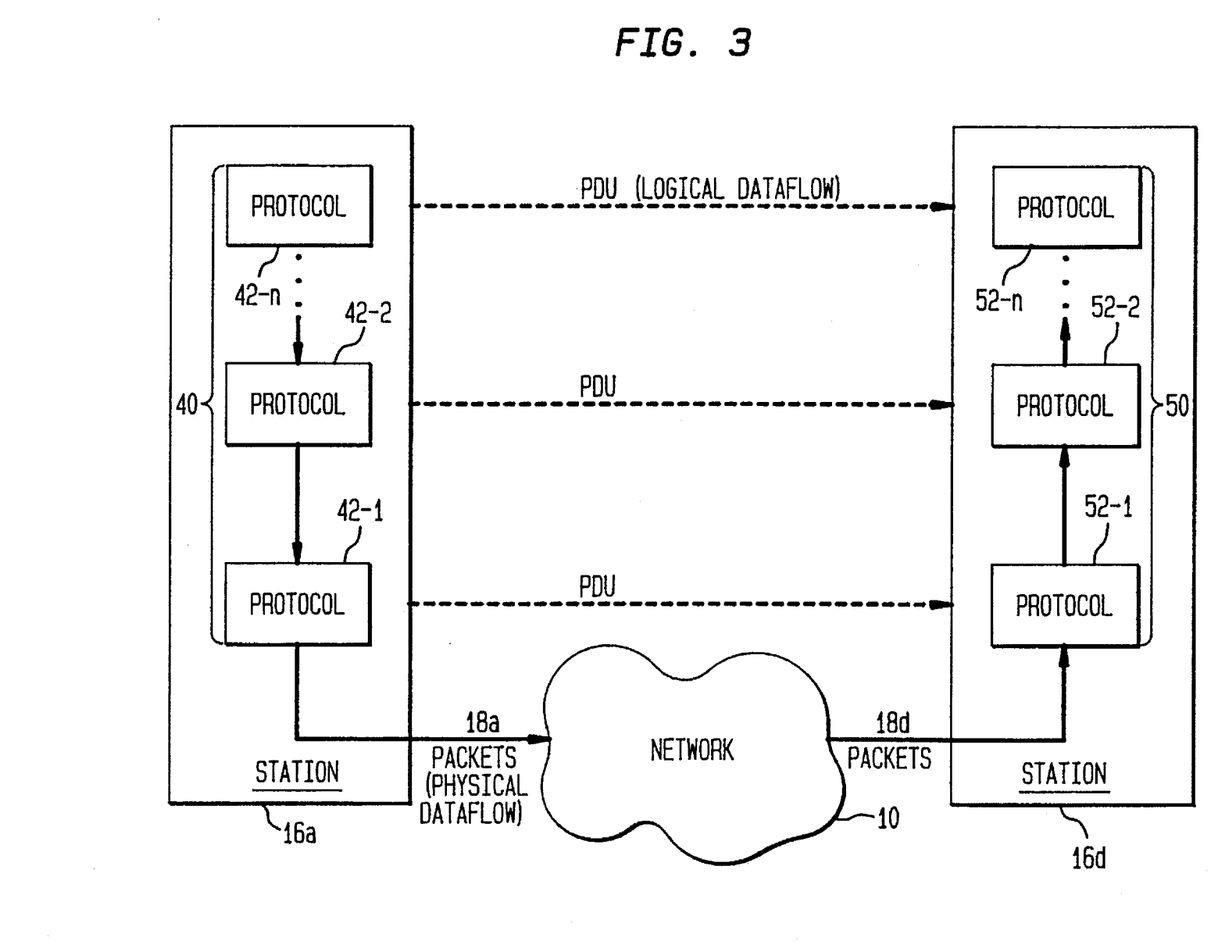

In general, a transmitting station (e.g. 16-A) and a receiving station (e.g. 16-D) communicate using a plurality of protocols which are arranged in layers. As shown in FIG. 3, the transmitting station 16-A has a protocol stack 40 comprising a plurality of protocols entities 42-1, 42-2, . . . , 42-N arranged in layers. The station 16-D has a corresponding protocol stack 50 comprised of protocol entities 52-1, 52-2, . . . , 52-N arranged in layers. The protocol entities 42 and 52 are software processes executed by a processor contained in the network interface 30 (see FIG. 2) of the stations 16-A and 16-D or executed by a CPU contained in the stations. Protocols may be executed in hardware, as well. Peer protocol entities (e.g. 42-1 and 52-1; 42-2 and 52-2; 42-N and 52-N) communicate logically using Protocol Data Units (PDU's). A PDU is the logical unit of protocol processing exchanged between peer protocol entities. Thus, as shown in FIG. 3, the protocol entity 42-1 transmits PDU's to the peer protocol entity 52-1. Similarly, the protocol entity 42-N transmits PDU's to the peer protocol entity 52-N.

Physically, communication between the transmitting station 16-A and the receiving station 16-B takes place using packets which are transmitted through the packet network 10. A packet is the unit of multiplexing in the network 10 and is the physical unit of data exchanged between user stations. The PDU's are mapped into the packets for transmission.

Layering of protocols is used to hide information to simplify processing. Typically, one or more PDU's generated in a layer K of a protocol stack are inserted into a PDU of the next lower layer K-1. Thus, a specific basic data unit (e.g., 1 byte) may belong to more than one PDU. Generally, seven layers of protocol processing are used with the highest layer being the application layer and lowest layer being the physical layer.

Several techniques can be used to increase the performance of a communication system. One technique for high performance is to process each packet as it arrives at the receiving station. The alternative is to buffer packets as they arrive and process them later. Buffering involves moving the data twice: once to the buffer and once to the processor. In Reduced Instruction Set Computer (RISC) workstation architectures, where data movement is relatively slow, immediate packet processing can increase protocol processing throughput.

The ability to process misordered data also improves communication network performance. Data misordering can be caused by message loss in the network. For example, if message 1 is received, message 2 is lost, and message 3 is received, message 2 will be retransmitted and received after message 3. Packet misordering can also occur if multipath routing is used. For example, obtaining gigabit rates on a SONET OC-3 ATM network requires using eight 155 Mbps ATM connections in parallel. Such multipath routing can result in packets leaving the network in a different order than the packets entered the network. Multipath routing also lowers latency for a single PDU if the PDU is split into packets that travel different routes. Processing of misordered data provides high application-to-application performance only if there are applications that can accept misordered data. One example of such an application is bulk data transfer. Regardless of the order in which data arrives, they can be correctly placed in the application address space. Another example is video. Although the video frames themselves must be present in the correct order, data of an individual frame can be placed in the frame buffer as they arrive without reordering. Protocol layers between the network layer and application layer also should be capable of processing misordered data.

Another technique for high performance is to reduce throughput and processing overhead by dividing each PDU so that it is transmitted in multiple packets, thus amortizing protocol control overhead across multiple packets. For example, consider two user stations which are supercomputers exchanging large blocks of data. For performance reasons, the supercomputers may prefer to do protocol processing on PDU's having a size of 64 kbyte even though the network packets may be much smaller. Similarly, in the case of an ATM network, an ATM cell is too small to carry a complete PDU. Also, interrupts can be reduced if the network interface issues interrupt commands only after complete PDU's have been received.

In short, three techniques for improving the performance of a communication network are:

(a) immediate packet processing (b) dividing PDU's among multiple packets (c) capability of processing misordered data Existing data transmission methods allow simultaneously at most two of these three techniques. For example, the VMTP protocol (see e.g., D. R. Cheriton, "VMTP: A Transport Protocol for the Next Generation of Communication Systems", Prox. ACM SIGCOMM '86, pp. 406–415, Stowe, Vt., August 1986) allows packets to be processed as they arrive, even if there is misordering, but does not spread PDU overhead across multiple packets.

The IP fragmentation protocol (see e.g. J. Postel, "Internet Protocol", RFC 791, DARPA Network Working Group, September 1981) spreads the overhead of high-layer PDU's across multiple packets and is designed to handle packet misordering. However, the IP fragmentation protocol requires that PDU's be reassembled before they are processed, and thus does not allow immediate packet processing. Arriving data must be moved to a reassembly buffer until the entire data block is reassembled, then the PDU is processed as a whole. Notice that two levels of fragmentation are used in such a system: data stream to PDU's and PDU's to fragments.

The Datakit URP protocol (see e.g. A. G. Fraser and W. T. Marshall, "Data Transport in a Byte Stream Network", IEEE Journal on Selected Areas in Communications, 7(7):1020–1033, September 1989) spreads PDU overhead across multiple packets and performs immediate packet processing. However, URP assumes that packets arrive in order. On a network with misordering, packets would have to be reordered before processing, which means that for this situation immediate packet processing is no longer possible.

In view of the foregoing, it is an object of the invention to provide a data transmission technique for use in a communications network such as a packet network which overcomes the shortcomings of the prior art data transmission techniques.

More particularly, it is an object of the invention to provide a data transmission technique for use in a packet network, which enables immediate processing of arriving packets, which enables PDU's to be divided over multiple packets, and which is capable of processing misordered packets. As indicated above, prior art transmission techniques can simultaneously achieve only two of these objectives.

It is also an object of the invention to provide a data transmission technique in which a group of data (called a chunk), requiring identical processing by the protocol stack at the receiving station, is transmitted with a completely self-describing header. This header contains enough information so that the associated group of data can be processed by the protocol stack at the receiving station independently of the arrival of any other group of data.

SUMMARY OF THE INVENTION

In accordance with the present invention, data is transmitted through a network in units called chunks. A chunk is a self describing unit which comprises a plurality of basic data units and a chunk header. The chunk header contains enough information So that all of the basic data units in the chunk can be processed in a protocol stack of a receiving station independently of the arrival of any other chunk at the receiving station.

More specifically, the chunk header, which is common to all the basic data units in the chunk, typically indicates:

(a) the type of basic data units in the chunk (e.g. control data or application data), (b) one or more protocol data units (e.g. transport, control or external) to which each basic data unit belongs, (c) the relative position of the basic data units in the one or more protocol data units, and (d) the protocol data unit boundaries.

In addition, the chunk header may include an indication of the size of the basic data unit (i.e. number of bits in the basic data unit) and the number of basic data units in the chunk.

Chunks are self-describing units designed for high speed protocol processing. Packets act as envelopes for carrying chunks across a network. The self-describing nature of chunks allow them to be processed as they arrive at the receiving station regardless of any misordering, so that no buffering is necessary. The ability to process data without intermediate buffering for reordering or reassembly improves protocol processing performance. Chunks are the basis of a flexible and efficient system for fragmentation. Chunks allow fragmentation, reassembly and the combining of an arbitrary number of chunks into a packet for efficient bandwidth utilization. Chunks can be reassembled in one step, regardless of how many times they have been fragmented. Because chunks can be processed in any order, the complexity of managing a reassembly buffer is eliminated.

End-to-end error detection of chunks can be performed using an error detection system that is invariant under chunk fragmentation.

DETAILED DESCRIPTION OF THE INVENTION

As indicated above, in accordance with the invention, data is transmitted in a network in units of chunks. A chunk is a completely self-describing data unit, within which all data is processed uniformly. A PDU may be mapped into one or several chunks.

A chunk includes one or more basic data units and a header. Illustratively, the basic data unit comprises 1 byte. The header includes a TYPE field to explicitly indicate whether the basic data units in the chunk are control data or application data. For example, basic data units from the payload of a transport level PDU are of TYPE "application", and basic data units from a PDU error detection field are of TYPE "control". PDU's may have more than one kind of control data, and thus multiple control TYPES in the chunk header may be used.

In addition to a TYPE field, basic data units in a PDU require additional fields for complete identification. For PDU application data (TYPE="data"), a (ID,SN,ST) tuple provides complete identification. The ID identifies the specific PDU to which the basic data units belong, and the SN is the sequence number of the basic data units within the PDU payload. The first basic data unit of the PDU has a SN of zero, and the last basic data unit of a PDU is indicated by an ST bit (Stop bit) that is set to one. The PDU payload is also known as a frame, and the (ID,SN, ST) tuple is framing information.

Figure 4:
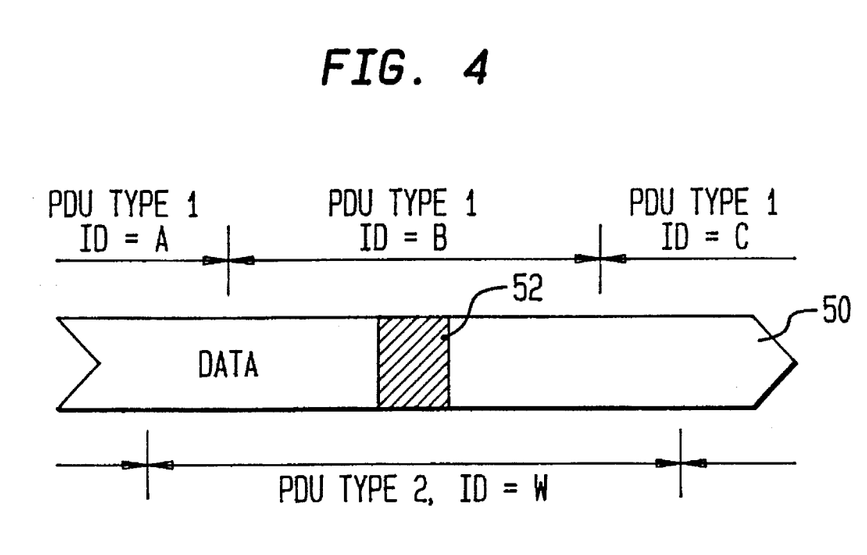
FIG. 4 illustrates how a basic data unit in a data stream can belong to multiple PDU's.

A single (ID,SN,ST) tuple is sufficient in a system that uses only a single PDU. However, most communication systems break the data stream into different sets of PDU's for different processing functions. For example, a single data stream may be divided into PDU's one way for error detection purposes, and divided into PDU's another way for encryption purposes. FIG. 4 shows how two different processing functions may frame the same data in different ways. FIG. 4 shows a data stream 50. The data stream 50 comprises a plurality of basic data units 52. There are two types of PDU's: PDU type 1 and PDU type 2. The PDU's of type 1 have ID=A,B,C. The PDU's of type 2 has an ID=W. The basic data unit 52 belongs to the type 1 PDU with ID=B and the type 2 PDU with ID=W. Thus, multiple (ID,SN,ST) tuples can be associated with a basic data unit, one for each different PDU in the communication system.

Illustratively, an entire connection is treated as a single, large PDU, and so one (ID,SN,ST) tuple is reserved for the connection. The connection ID is intended to refer to a single, unmultiplexed application-to-application conversation. The SN and ST function as previously described, with one exception. Unlike other PDU's, SN's of connections are reused over time. The beginning of a connection is indicated with a special signalling message (connection establishment) rather than with an SN of zero.

Although conceptually each piece of data is labelled with a TYPE field and multiple (ID,SN,ST) tuples, a group of data with contiguous sequence numbers (SN's) that have identical TYPE's and ID's can share a single header. Thus, a chunk is a group of basic data units, along with a single header to label the basic data units. The chunk header carries the TYPE and ID's shared by all the basic data units of the chunk, the SN's of the first basic data unit of the chunk, and the ST bits for the last basic data unit of the chunk. Because all chunk data share identical TYPE and ID fields, the chunk payload is processed uniformly by all protocol functions. In addition, the chunk header preferably carries SIZE and LEN fields that indicate the size of the basic data unit (e.g. 1 byte) and the number of basic data units in the chunk. It should be noted that any time a PDU boundary occurs, a new chunk is needed because at the boundary the ID changes for the particular PDU type.

Figure 5:
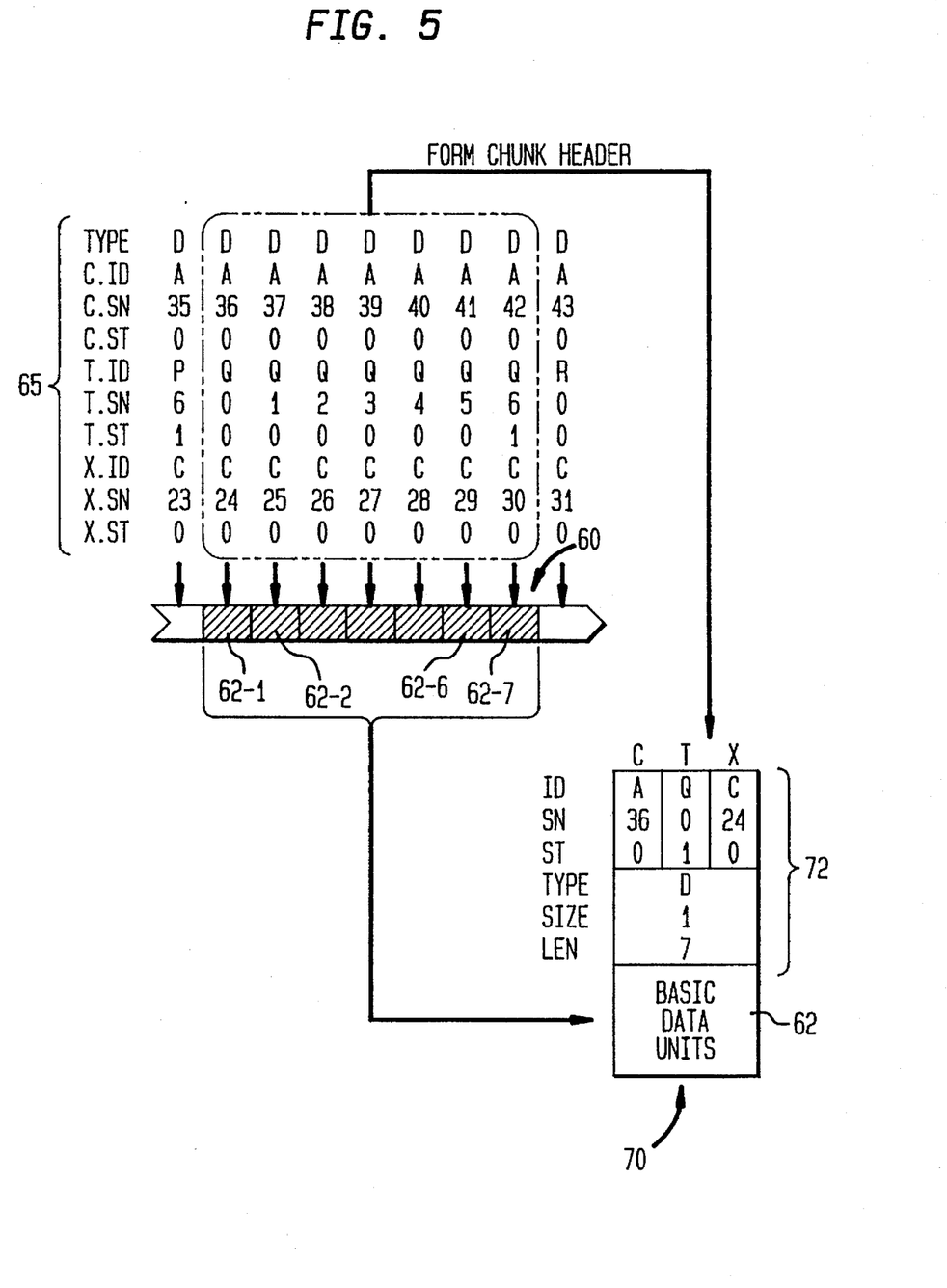
FIG. 5 illustrates the formation of a data chunk in accordance with an illustrative embodiment of the present invention.

Control information also is carried in chunks. In some cases, the control information from a PDU is indivisible over chunks (i.e. must be carried in a single chunk). In this case, no LEN field is needed. Alternatively, if the control information from a PDU is divisible over several chunks, then these chunks will include a LEN field. FIG. 5 illustrates the formation of a chunk. In FIG. 5 a data stream 60 is shown as comprising a plurality of basic data units 62. Seven basic data units 62 (labeled 62-1, 62-2, . . . , 62-7) are formed into the chunk 70. As shown in FIG. 5 the chunk 70 includes the basic data units 62 and the chunk header 72.

The formation of the chunk header may be understood in connection with the chart 65. In the chart 65, each of the basic data units 62 in the chunk is characterized with respect to TYPE (in this case all are DATA) and (ID, SN, ST) tuples are provided for each of three types of PDU's. These exemplary PDU's are: transport PDU's (TPDU's) represented by the tuple (T.ID, T.SN, T.ST), external PDU's represented by the tuple (X.ID, X.SN, X.ST), and connection PDU's represented by the tuple (C.ID, C.SN, C.ST).

It should be noted that the basic data unit 62-7 has to be the last data unit in the chunk because at the next basic data unit T.ID changes. If the next basic data unit were to be included in the chunk, the header would not apply uniformly to all basic data units in the chunk.

One way to reduce chunk header size is to avoid including chunk header fields that seldom change. For example, instead of carrying an explicit SIZE field, chunk size information can be shared by specification or by signalling. With the specification approach, the value of the SIZE field of each chunk TYPE is part of a protocol specification. An alternative is to use a signalling system similar to that used for a virtual circuit; when a connection is formed, the value of the SIZE field of each chunk TYPE can be carried in the signalling message.

Figure 6:
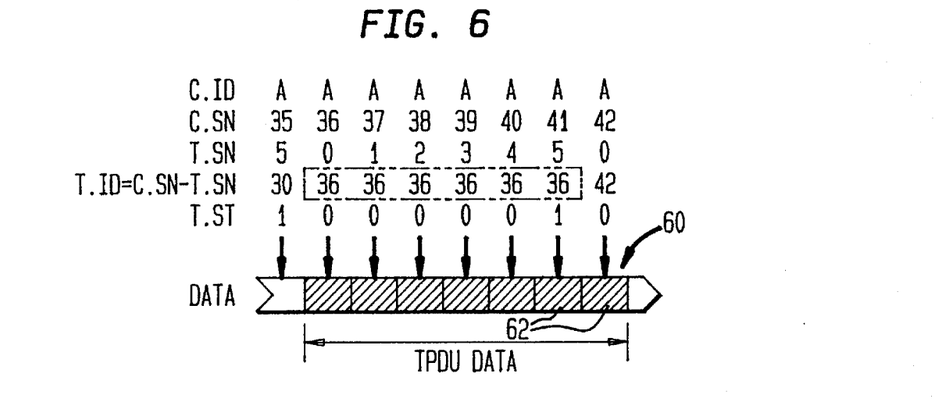
FIG. 6 illustrates the formation of an implicit Transport ID (T.ID) in accordance with an illustrative embodiment of the present invention.

Some chunk header ID fields can be eliminated with the use of implicit ID's. An implicit ID takes advantage of the fact that the SN fields of a chunk change in lock-step. For example, consider the C.SN (connection SN) and T.SN (TPDU SN) fields of a TPDU. The value of (C.SN–T.SN) may be identical for each chunk of a TPDU, and this difference can be used in place of an explicit T.ID (TPDU ID) field. FIG. 6 shows an example of how an implicit ID is derived for the basic data units 62 of the data stream 60.

Another way to reduce chunk header size is to minimize the number of different frames used by different protocol functions. Because each different frame requires a separate (ID,SN,ST) tuple, the fewer different frames, the smaller the chunk header. Also, each time any frame boundary occurs, a new chunk header is needed. Consequently, aligning frame boundaries also reduces the chunk header overhead.

In some cases, the chunks headers within a packet may be related; if so, some chunk fields may be implicit rather than explicit. For example, because the chunk following the last TPDU DATA chunk is always a TPDU ED (Error Detection) chunk, the ED chunk does not require a chunk header because its TYPE is known, and its C.ID and T.ID fields can be derived from the DATA chunk header. In general, positional information and Huffman encoding can be used to reduce the chunk header overhead within a packet.

On a network that has low loss and maintains packet order, it is not necessary to send SN's in each chunk header. SN's can be regenerated at the receiving station with a counter that is incremented each time a basic data unit is received. However, because loss and misordering may occur, the counter at the receiving station may sometimes lose synchronization with the transmitting station. To recover synchronization, the transmitting station may send SN information to the receiver occasionally, such as at the beginning of each PDU. During the time that the receiving station is out of synchronization, an error detection system can be used to detect the incorrect sequence numbers and allow any incorrect chunks to be discarded.

In general, chunks are pieces of PDU's and chunks are moved among protocol processors inside of packets. Packets can be considered envelopes that carry integral numbers of chunks. If a chunk is longer than a packet, it can be split into smaller chunks that fit into packets. Each fragmented chunk has the same TYPE, SIZE and ID (C.ID, T.ID, and X.ID) fields as the original chunk. The LEN and SN fields (C.SN, T.SN, and X.SN) are adjusted appropriately to reflect the contents of the new chunk. Only the chunk that contains the last data of the original chunk has its ST bits (C.ST, T.ST, and X.ST) set to the values of the ST bits in the original chunk; no ST bits are set in any other chunk. The detailed algorithm for fragmenting a chunk is provided in Appendix A. The SIZE field assures that the basic data units of protocol data processing are not split.

Figure 7:
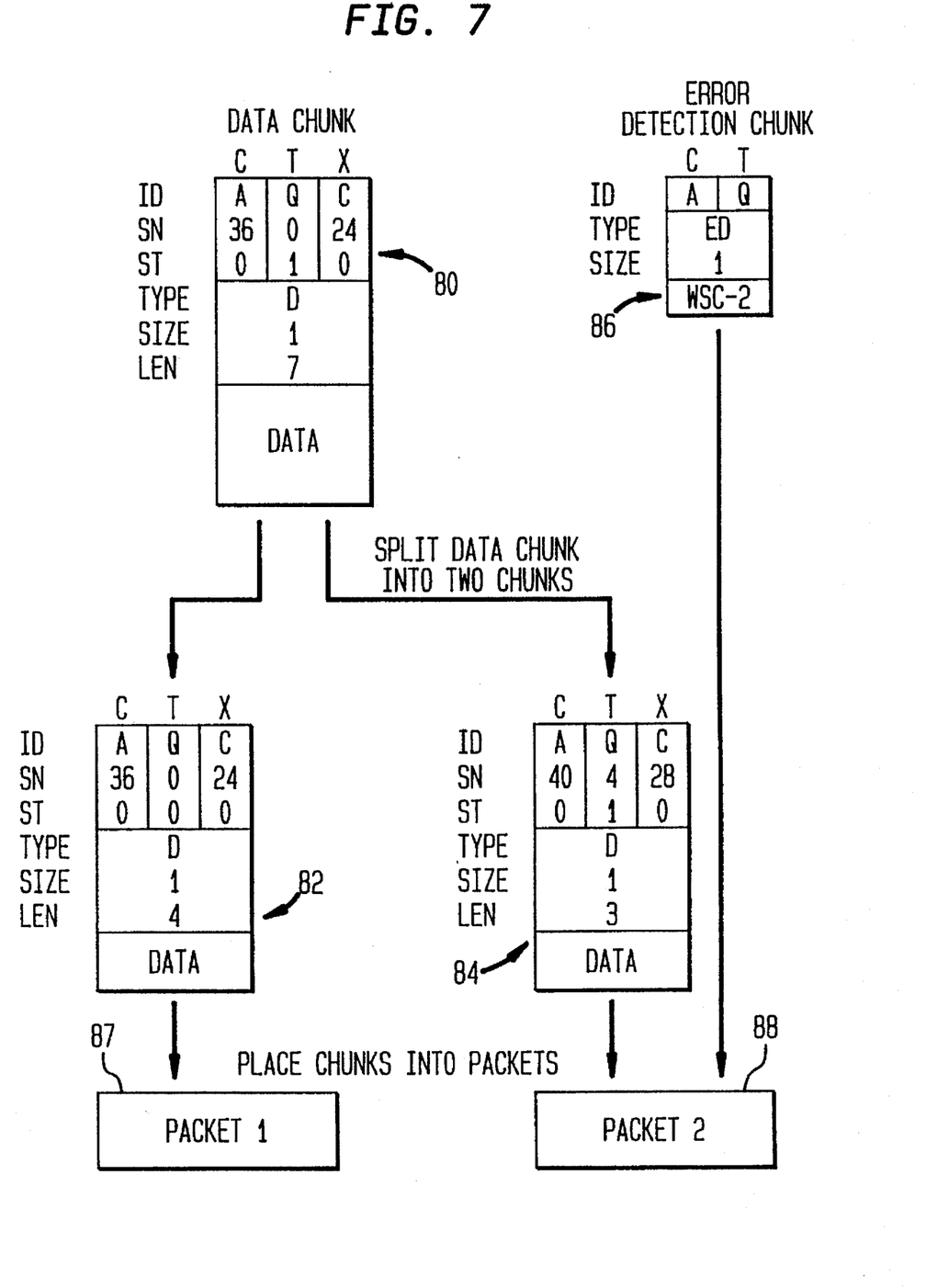
FIG. 7 illustrates the mapping of data chunks into packets in accordance with an illustrative embodiment of the present invention.

FIG. 7 illustrates a chunk 80 which is fragmented into two smaller chunks 82 and 84. The chunk headers have been adjusted in the manner indicated above.

If a chunk is smaller than a packet, then as many chunks as fit can be placed in a single packet. For example, as shown in FIG. 7, TPDU data chunk 84 and a TPDU control chunk 86 (TYPE=ED) that contains error detection codes are combined into a single packet 88. (The chunk 82 is inserted into the packet 87). The chunks are removed from the packets and processed separately at the receiving station. Because chunks allow misordering, how the chunks are placed in a packet is irrelevant. Placing multiple chunks in a packet may be necessary if it is desired to send an entire PDU in a single packet. If chunks do not fill a packet completely, it is desirable to indicate when the last valid chunk has been reached. A chunk with LEN=0 is placed after the last valid chunk in the packet. Chunks are well suited to fragmentation because chunks preserve all of their properties under fragmentation. Also, regardless of how many different fragmentation steps occur, chunks can be efficiently reassembled in a single step. Chunk fragmentation is easiest to understand when packets are considered as envelopes that carry chunks. Whenever there is a change from one packet size to another packet size, it is as if chunks are emptied from one size of envelope and placed in another size of envelope.

When moving chunks from large packets to small packets, it may be that some chunks are too large to fit into the small packets. If so, the large chunk can be split into smaller chunks that do fit into the small packets, as was shown in FIG. 7 and described in Appendix A. Because splitting a chunk forms multiple chunks by definition, the receiving station always receives packets filled with chunks, and the format of the received chunks is identical regardless of how much network fragmentation occurs.

Figure 8:
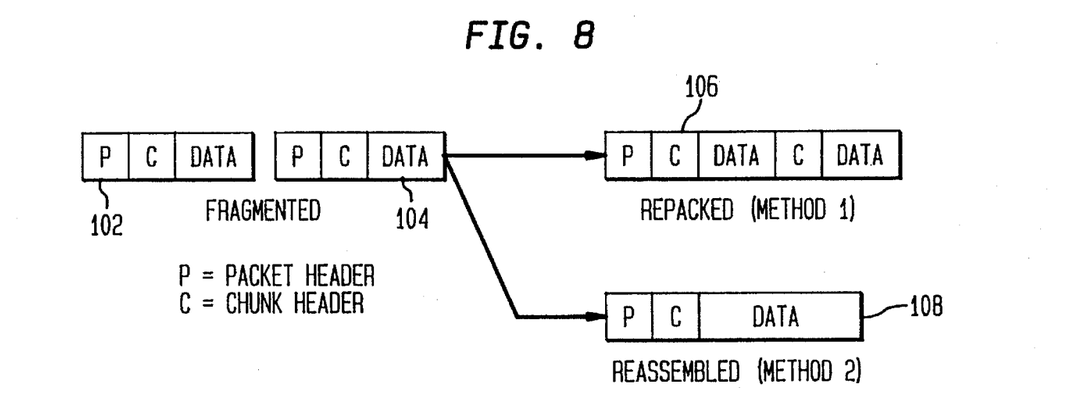
FIG. 8 illustrates the fragmentation and reassembly of data chunks in accordance with an illustrative embodiment of the present invention.

As shown in FIG. 8, when moving chunks from small packets (e.g., packets 102, 104) to large packets, there are the two choices:

1. According to method 1, the two chunks in the packets 102, 104 are placed in a larger packet 106. However, the two chunks are not reassembled into a larger chunk and each has its own chunk header.
2. According to method 2, the two chunks are reassembled into a single chunk before being inserted into a larger packet 108. In this case, there is now only a single chunk header. An algorithm for performing chunk reassembly is contained in Appendix B.

At some point in the receiver, there is performed complete reassembly of the transmitted data. There are several options:

Let the application deal with reassembly

Reorder data before passing them to an application

Reassemble data into larger blocks (e.g., complete PDU's) before passing to an application The second and third options are not mutually exclusive. As discussed previously, passing data to the application as it arrives has both latency and throughput advantages over reordering and reassembly. Immediate packet processing minimizes data movement, while reassembly requires two accesses to each piece of data: one access to examine the header for reassembly purposes and one access for protocol processing after reassembly is complete. Reordering is somewhere in-between and the number of times that data must be accessed depends on the amount of misordering in the network. Maximum system performance is achieved if any reordering or reassembly happens as close to the application as possible.

Any of the approaches presented above can be used with chunks because a plurality of smaller chunks can be assembled into a larger chunk in a single step regardless of whether fragmentation occurs in the network using the algorithm of Appendix B. Thus, chunks can provide the low PDU overhead of fragmentation with the reassembly efficiency of avoiding fragmentation.

Regardless of whether the receiving station performs physical PDU reassembly, packet reordering, or immediate packet processing, virtual reassembly is performed. Virtual reassembly means keeping track of the received fragments to determine when all of the fragments of a PDU have been received. If physical reassembly is used, virtual reassembly indicates that a PDU is ready for processing. If reordering or immediate packet processing is used, virtual reassembly indicates all pieces of a PDU have been processed incrementally. For example, if an error detection check sum is computed incrementally as fragments arrive, completion of PDU virtual assembly indicates that the incremental checksum is ready to be compared with the received checksum of the PDU.

Virtual reassembly also may be used to reject duplicate data. For example, if an incremental checksum calculation is performed, processing the same TPDU piece twice must be avoided, as this may cause the checksum to be incorrect even if no data corruption has occurred. Another reason to reject duplicates is to prevent a corrupted duplicate from overwriting uncorrupted data that has already been received.

In a communication system, it is desirable to use end-to-end error detection, because it provides higher reliability than hop-by-hop error detection. The transport layer protocol in the receiving station is responsible for end-to-end error detection. Layers above the transport protocol expect that both the application data and control parts of their PDU's are protected by the transport protocol.

End-to-end detection of higher-layer PDU's is conventionally performed by carrying the higher-layer PDU's (framing, control information, and data) as TPDU payload. With chunks, higher-layer PDU framing information is carried in chunk headers, so both chunk headers and payloads are preferably protected by the error detection code. Because chunk headers are manipulated during network fragmentation, end-to-end error detection requires an error detection code value that is unaffected by the fragmentation procedure. An illustrative technique for performing end-to-end error detection using chunks is described below.

The end-to-end error detection uses an error detection code, for example a Weighted Sum Code (WSC-2), that can be applied to misordered data and has the error detection power of an equivalent cyclic redundancy code (CRC). Other error correction codes may be used, as well. This error detection code is described in a patent application entitled Weighted Sum Codes for Error Detection having Ser. No. 08/222,628 filed for Anthony J. McAuley on Apr. 4, 1994, now U.S. Pat. No. 5,526,370, issued Jun. 11, 1996 and assigned to the assignee hereof. The contents of this application are incorporated herein by reference. A WSC-2 encoder takes 32-bit symbols of data and creates two 32-bit parity symbols, Po and P1 such that:

$$P_1 = \sum_{i=0}^{k-1} (i+2) \odot d_i \qquad P_0 = P_1 \oplus \sum_{i=0}^{k-1} d_i$$

where $d_i$ is a 32-bit data symbol and the operations $\Sigma$, $\oplus$, and $\odot$ are addition and multiplication performed in $GF(2^{32})$.

Acceptable values for i are $0 \leq i < 2^{29}$; if there is less than $2^{29}-2$ data symbols, the i values left unused are equivalent to encoding a symbol of zero at that i value. Consequently, WSC-2 will work correctly as long as the error detection protocol specifies which unique value of i should be used for each symbol that is covered by the error detection code. The error detection system disclosed herein for chunks takes advantage of this flexibility.

Figure 9:
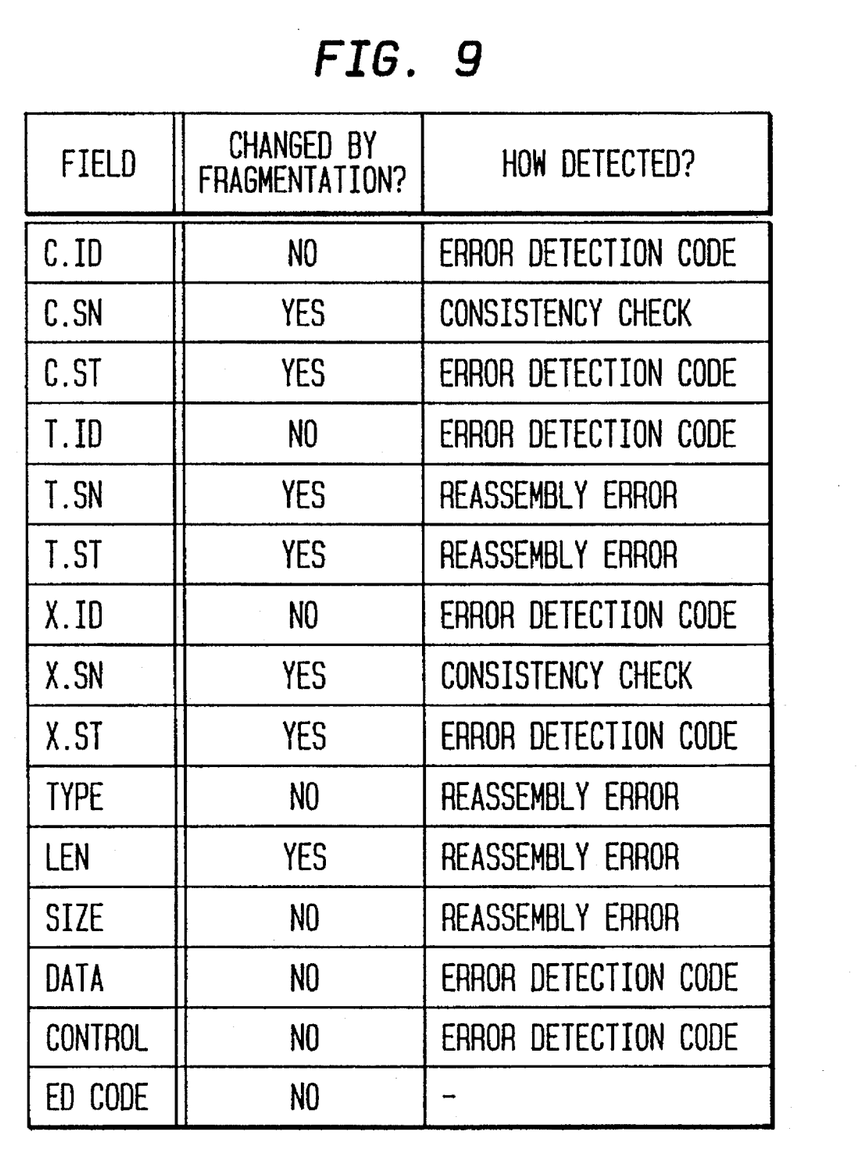
FIG. 9 is a table which indicates how errors are detected in different fields of a chunk header.

In the error detection technique disclosed herein, errors are detected in three different ways: error detection code mismatch caused by virtual reassembly error, error detection code mismatch caused by header or data corruption, and inconsistency among certain TPDU header fields. FIG. 9 is a table which lists the chunk header fields of the chunk 70 shown in FIG. 5, whether a field is altered by fragmentation, and how the results of corruption are detected. Recall from before that the TYPE field distinguishes between application data and control data parts of PDU's, the SIZE field gives the size of the basic data unit contained in a chunk, the LEN field gives the number of basic data units carried by a chunk, the (C.ID, C.SN, C.ST) tuple is framing information for the connection between two clients, the (X.ID, X.SN, X.ST) tuple is external framing information (e.g., application layer framing or ALF), and the (T.ID, T.SN, T.ST) tuple is TPDU framing information.

The error detection methods used for different groups of chunk fields are now described in greater detail. Corruption of some fields (TYPE, LEN, SIZE, TSNAND TST) will cause virtual reassembly to fail, either because reassembly never completes or because reassembly completes incorrectly such that error detection code mismatch will occur. These fields need not be covered explicitly by the error detection code.

Figure 10:
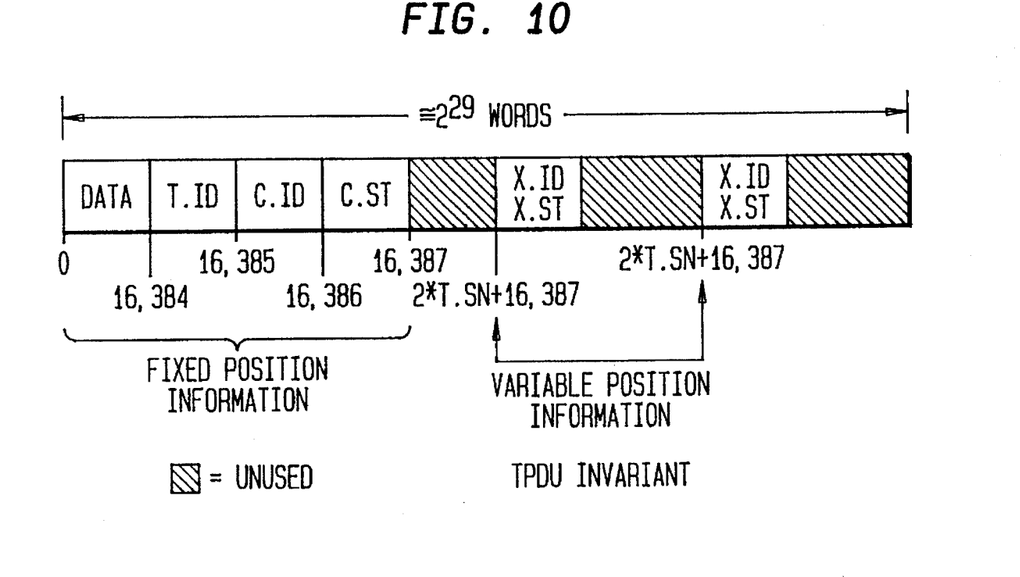
FIG. 10 illustrates an invariant of a transport layer protocol under chunks fragmentation.

For the fields that are covered by the error detection code, detection is performed on an invariant of the TPDU under chunk fragmentation. The invariant is simply a way of assuring that the transmitting station and receiving station perform error detection on the same chunk fields in the same way regardless of how network fragmentation alters chunk header fields. The TPDU invariant is shown in FIG. 10. The numbers indicate offset from the beginning of the error detection code space (i=0) in 32-bit symbols. Error detection encoding/decoding is required only for the labeled areas; the shaded areas are unused. It is assumed that the TPDU data is limited to 16,384 32-bit symbols, and that this information is encoded as symbols 0 through 16,383 of the error detection block. The T.ID and C.ID are constant for all chunks of a TPDU, and are encoded as symbols 16,384 and 16,385 of the error detection block. The C.ST bit can be set only on a TPDU boundary, so a set C.ST bit can occur at most once in a TPDU. The C.ST value is encoded as symbol 16,386 of the error detection block.

Figure 11:
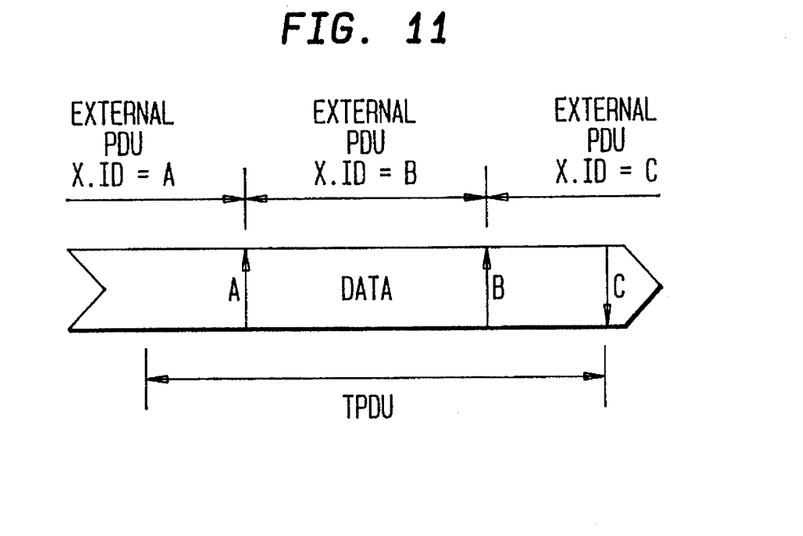
FIG. 11 illustrates the encoding of the X.ID and X.ST fields in accordance with the invention.

The X.ID and X.ST fields are more complicated to encode, because multiple X.ID's may exist in a TPDU. For each unique X.ID that occurs in the TPDU, exactly one appearance of the X.ID somewhere in the error detection code space is desired. To assure that each X.ID is encoded exactly once, the X.ID field of chunk headers is encoded with the X.ST bit set. Because the X.ST bit is set once for each external PDU, the X.ID of the PDU is encoded exactly once. The only remaining X.ID that may not be encoded for a TPDU is the X.ID of an external PDU that begins but does not end within the TPDU. To assure that this X.ID is encoded exactly once, the X.ID field of chunk headers is also encoded with the T.ST bit set. Because the T.ST bit is set once per TPDU, the X.ID of the last external PDU of the TPDU is encoded exactly once. FIG. 11 shows a TPDU which contains pieces of three external PDU's. The vertical arrows show which PDU boundary triggers the encoding of each X.ID field.

Because it is possible that the T.ST and X.ST bits are set simultaneously, the value of the X.ST bit associated with each encoded X.ID field is encoded to detect X.ST bit corruption if both the X.ST and T.ST bits are set simultaneously. Illustratively, the X.ID is 32 bits and the X.ST is one bit, and they are encoded within two 32-bit symbols. To assure that no two X.ID/X.ST pairs overlap each other or any other information in the error detection code space, the two symbols are encoded starting at position 2T.SN+16,387, where T.SN is the T.SN of the data element for which the X.ST or T.ST is set.

The two fields not yet discussed are the C.SN and X.SN fields. If the C.SN is uncorrupted, the value of (S.CN−T.SN) is constant for all chunks of a TPDU. If the X.SN is uncorrupted, the value of (C.SN−X.SN) is constant for all chunks of an external PDU within a TPDU. If all chunks of a PDU do not have identical values for either of these differences, then the TPDU is corrupted.

As might have been expected, the difficult part of end-to-end error detection with chunks is handling the higher-level framing and SN information: the S.CN, X.ID, X.SN, and X.ST fields. Although the above-described example uses chunks designed for one type of external PDU, the same basic idea can be generalized to provide end-to-end error detection of chunks designed for multiple types of external PDU's.

In short, chunks are self-describing data units designed for high performance protocol processing. Chunks are typed pieces of PDU's and packets act as envelopes for carrying chunks across a network. The self-describing nature of chunks allows them to be processed as they arrive at the receiver, regardless of any misordering. The ability to process data without intermediate buffering for reordering or reassembly improves protocol processing performance.

Chunks can be the basis of a flexible and efficient system for fragmentation. Chunks allow fragmentation, reassembly, and the combining of arbitrary chunks into a packet for efficient bandwidth utilization. Chunks can be reassembled efficiently in one step, regardless of how many times they've been fragmented.

Finally, the above-described embodiments of the invention are intended to be illustrative only. Numerous alternative embodiments may be devised by those skilled in the art without departing from the scope of the following claims.

APPENDIX A

Fragmentation Algorithm
Assume that we have a chunk that we wish to fragment into two chunks, chunk_a and chunk_b.
The algorithm below can be repeated until each chunk carries only a single unit of data.

```
If: chunk.len > 1
Then:
    chunk_a.type ← chunk.type
    chunk_a.size ← chunk.size
    chunk_a.len ← new_len
    chunk_a.c.id ← chunk.c.id
    chunk_a.t.id ← chunk.t.id
    chunk_a.x.id ← chunk.x.id
    chunk_a.c.sn ← chunk.c.sn
    chunk_a.t.sn ← chunk.t.sn
    chunk_a.x.sn ← chunk.x.sn
    chunk_a.c.st ← 0
    chunk_a.t.st ← 0
    chunk_a.x.st ← 0
```

APPENDIX A-continued

Fragmentation Algorithm

Assume that we have a chunk that we wish to fragment into two chunks, chunk_a and chunk_b.
The algorithm below can be repeated until each chunk carries only a single unit of data.

```
For: 0 ≤ i < new_len
    chunk_a.data[i] ← chunk.data[i]
chunk_b.type ← chunk.type
chunk_b.size ← chunk.size
chunk_b.len ← chunk.len − new_len
chunk_b.c.id ← chunk.c.id
chunk_b.t.id ← chunk.t.id
chunk_b.x.id ← chunk.x.id
chunk_b.c.sn ← chunk.c.sn + new_len
chunk_b.t.sn ← chunk.t.sn + new_len
chunk_b.x.sn ← chunk.x.sn + new_len
chunk_b.c.st ← chunk.c.st
chunk_b.t.st ← chunk.t.st
chunk_b.x.st 4_chunk.x.st
For: new_len ≤ i < chunk.len
    chunk_b.data[i] ← chunk.data[i − new_len]
```

APPENDIX B

Reassembly Algorithm

Assume that we have two chunks, chunk_a and chunk_b, that we wish to reassemble into chunk_c. The algorithm below can be repeated as long as eligible chunks exist.

```
If:
    (chunk_a.type = chunk_b.type) ∧
    (chunk_a.size = chunk_b.size) ∧
    (chunk_a.c.id = chunk_b.c.id) ∧
    (chunk_a.t.id = chunk_b.t.id) ∧
    (chunk_a.x.id = chunk_b.x.id) ∧
    (chunk_a.c.sn + chunk_a.len = chunk_b.c.sn) ∧
    (chunk_a.t.sn + chunk_a.len = chunk_b.t.sn) ∧
    (chunk_a.x.sn + chunk_a.len = chunk_b.x.sn)
Then:
    chunk_c.type ← chunk_a.type
    chunk_c.size ← chunk_a.size
    chunk_c.len ← chunk_a.len + chunk_b.len
    chunk_c.c.id ← chunk_a.c.id
    chunk_c.t.id ← chunk_a.t.id
    chunk_c.x.id ← chunk_a.x.id
    chunk_c.c.sn ← chunk_a.c.sn
    chunk_c.t.sn ← chunk_a.t.sn
    chunk_c.x.sn ← chunk_a.x.sn
    chunk_c.c.st ← chunk_b.c.st
    chunk_c.t.st ← chunk_b.t.st
    chunk_c.x.st ← chunk_b.x.st
    For: 0 ≤ i < chunk_a.len
        chunk_c.data[i] ← chunk_a.data[i]
    For: chunk_a.len ≤ i < chunk_b.len
        chunk_c.data[i] ← chunk_b.data[i − chunk_a.len]
```

I claim:

1. A method of transmitting data from a transmitting station via a network to a receiving station, said data including a plurality of basic data units which together comprise a protocol data unit, said method comprising the steps of, at said transmitting station, transmitting said data in said network in units of chunks, each said chunk comprising one or more basic data units, and a chunk header common to all of the basic data units of the chunk and which indicates:

(a) the type of basic data units in the chunk, (b) protocol data units to which each basic data unit in the chunk belongs, (c) the relative position of the basic data units in said protocol data units, (d) the size of each basic data unit in the chunk and the number of basic data units in the chunk, and (e) boundaries of the protocol data units, and, at said receiving station, receiving and processing said basic data units.

2. The method of claim 1 wherein the types of basic data units in each chunk are application data and various types of control data.

3. The method of claim 1 wherein said protocol data units include transport layer protocol data units.

4. The method of claim 3 wherein said protocol data units also include connection protocol data units.

5. The method of claim 4 wherein said protocol data units also include external protocol data units.

6. The method of claim 1 wherein said transmitting step further includes the step of fragmenting a chunk into a plurality of smaller sized chunk units, each of said smaller sized chunk units having its own chunk header with a format identical to that of the original chunk header.

7. The method of claim 1 wherein said transmitting step further includes the step of assembling a plurality of smaller chunk units, each with its own chunk header, into a single chunk unit with a single chunk header.

8. The method of claim 1 wherein said network is a packet network and said transmitting step comprises transmitting packets containing one or more chunks from said transmitting station to said receiving station.

9. The method of claim 1 wherein said method further comprises the step of at said receiving station, processing the data contained in each said chunk without depending on the arrival of any other chunk at the receiving station.

10. The method of claim 1 further comprising the step of performing end-to-end error detection on said chunks, said error detection step comprising the step of applying an error detection code to an invariant of a protocol data unit.

11. A method of transmitting data in a packet network having a transmitting station and a receiving station comprising the steps of:

at said transmitting station connected to said network, organizing said data into chunks, each chunk comprising one or more basic data units, and a chunk header which indicates the data type, one or more protocol units to which the basic data units in the chunk belong, the relative position of the basic data units of said one or more protocol data units, the number of basic data units in the chunk, the size of the basic data units, and if a last of said basic data units is the last basic data unit of a protocol data unit, at said transmitting station, placing one or more of said chunks into a plurality of data packets;

transmitting said data packets via said network; and at said receiving station, removing said chunks from said packets and then processing said data in each said chunk.

12. The method of claim 11 further comprising the step of: in said network, fragmenting said chunks into smaller chunks, each of said smaller chunks having its own chunk header.

13. The method of claim 11 further comprising the step of:

assembling a plurality of said chunks, each with its own chunk header, into a single larger chunk with a single chunk header.

14. The method of claim 11 wherein said step of processing at said receiving station comprises the step of starting to process each said chunk without depending on the arrival of any other chunk at said receiving station.

15. A method for transmitting data between a transmitting station having a first processing unit for executing protocols organized in a first protocol stack and a receiving station having a second processing unit for executing protocols organized in a second protocol stack, peer protocol entities in said first and second stacks communicating logically in protocol data units, said transmitting station and said receiving station communicating physically by transmitting data packets through a network connecting said transmitting station and said receiving station, said method comprising the steps of:

at said transmitting station, organizing said data to be transmitted into chunks, each chunk comprising one or more basic data units and a chunk header common to all of the basic data units, said chunk header being descriptive of all said basic data units, said chunk header identifying (a) one or more protocol data units to which said basic data units belong, (b) the relative position of said basic data units in said protocol data units and if a last of the basic data units in the chunk is the last basic data unit of said protocol data units, (c) the size of the basic data unit and the number of basic data units in the chunk, and (d) the type of data in said basic data units, so that the basic data units of the chunk can be processed in a peer protocol entity in the second protocol stack at said receiving station without depending on the arrival of any chunk from any other peer protocol entity in the second protocol stack at said receiving station, each of said packets containing one or more chunks, and at said receiving station, receiving each said chunk and processing said basic data units of each said chunk.

16. A method for communicating data in packets between a transmitting station and a receiving station over an intervening network, said data including protocol data units and said method comprising the steps of:

at said transmitting station, assembling said data into units of chunks, each chunk being self-describing and comprising one or more basic data units and a chunk header common to all of the basic data units of the chunk and containing the self-describing information which indicates:

(a) the type of basic data units in the chunk, (b) one or more protocol data units to which the basic units in the chunk belong;

(c) the relative position of the basic data units in said one or more protocol data units; and (d) the boundaries of the one or more protocol data units, inserting a plurality of said chunks into individual ones of said packets, and transmitting said packets over said network to said receiving station; and at said receiving station, receiving said packets, selectively removing some of the chunks from individual ones of said packets in accordance with the self-describing information in the chunk headers of the chunks, and processing the data contained in the chunks thus removed.

17. The method in accordance with claim 16, wherein each said chunk header of each said chunk inserted in said packets also indicates the size of each basic data unit in the chunk and the number of basic data units in the chunk.

* * * * *